United States Patent [19]

Wratil

[11] 4,260,662

[45] Apr. 7, 1981

[54] ENAMELED PARTS MADE OF HEAT-RESISTANT METALS

[75] Inventor: Josef Wratil, Bergisch-Gladbach, Fed. Rep. of Germany

[73] Assignee: Reimbold & Strick GmbH & Co KG, Köln-Kalk, Fed. Rep. of Germany

[21] Appl. No.: 55,846

[22] Filed: Jul. 9, 1979

[30] Foreign Application Priority Data

Jul. 7, 1978 [DE] Fed. Rep. of Germany ....... 2829993
Jul. 7, 1978 [DE] Fed. Rep. of Germany ....... 2829959

[51] Int. Cl.$^3$ ...................... B32B 15/04; B32B 17/06; C03C 7/02; C03C 7/04
[52] U.S. Cl. ....................................... 428/433; 60/302; 106/48; 106/49; 428/457
[58] Field of Search .......................... 106/48, 49, 48 C; 428/433, 457

[56] References Cited

U.S. PATENT DOCUMENTS

| 2,487,119 | 11/1949 | Fenton | 106/48 |
| 2,975,072 | 3/1961 | Bryant et al. | 106/48 |
| 3,203,815 | 8/1965 | Michael | 106/49 |
| 3,220,794 | 11/1965 | Stiles | 423/599 |
| 3,482,955 | 12/1969 | Monks | 106/47 |
| 3,547,098 | 12/1970 | Lee | 252/428 |

*Primary Examiner*—Helen M. McCarthy
*Attorney, Agent, or Firm*—Sprung, Felfe, Horn, Lynch & Kramer

[57] ABSTRACT

A frit of the following approximate analysis in percent by weight

| Alumina | $Al_2O_3$ | 8 to 12 |
| Boron trioxide | $B_2O_3$ | 40 to 60 |
| Sodium monoxide | $Na_2O$ | 6 to 14 |
| Lead monoxide | PbO | 0 to 7 |
| Calcium oxide | CaO | 6 to 11 |
| Barium oxide | BaO | 7 to 12 |
| Manganese oxide | MnO | 2 to 6 |
| Cobalt oxide | CoO | 0 to 2 |
| Silica | $SiO_2$ | Under 1 | when admixed with other materials, in parts by weight as follows

| frit | 30 to 60 |
| aluminum powder | 5 to 60 |
| silicon powder | 0 to 8 |
| chromium trioxide | 0 to 10 |
| zirconium silicate | 0 to 10 |
| copper oxide | 0 to 3 |
| bentonite | 0.5 to 3 |
| water | 70 to 80 | applied to an iron-based part, and then fired at 800° to 950° C. results in a heat-resistant weldable enamel. It is especially suited for automobile engine mufflers.

1 Claim, No Drawings

ENAMELED PARTS MADE OF HEAT-RESISTANT METALS

BACKGROUND OF THE INVENTION

It is known to enamel parts made of heat-resistant metals, in particular iron and iron alloys, which are exposed to high-temperature gases of combustion, such as combustion chambers, heat exchangers and exhaust systems, including mufflers.

However, the enamels used up to now for this purpose have had several drawbacks. Their heat resistance has been inadequate. Due to the reboiling effect, small bubbles would form in the enamel in the heated areas. Temperature changes have resulted in mechanical damage. There have been problems of adherence at welded seams. Sharp edges on the parts, as around punched holes, have remained insufficiently coated with enamel.

In special enamels of conventional composition based on silicates, as for selfcleaning ovens or for gas-heater flues and heat exchangers, for example, use has been made of aluminum powder. However, enamel slip of such composition containing aluminum powder continually evolves hydrogen, which makes the enamel frothy and causes trouble when it is ground. This has in the past occasionally resulted in dangerous oxyhydrogen gas explosions in the preparation of the slip and in its application. Metallic silicon behaves in a similar manner.

SUMMARY OF THE INVENTION

The object of the invention is to provide a high-temperature enamel for parts made of heat-resistant metals which are exposed to high-temperature combustion gases, said enamel being free of these drawbacks when used for said purposes, and its slip being readily preparable and applicable.

DETAILED DESCRIPTION OF THE INVENTION

Thus the invention has as its object enameled parts such as exhaust systems of internal-combustion engines, and especially mufflers, made of heat-resistant metals, in particular iron and iron alloys, which are coated with an enamel in which aluminum powder is embedded and whose glass phase has the following approximate composition in weight percent:

| Alumina | $Al_2O_3$ | 8 to 12 |
| --- | --- | --- |
| Boron trioxide | $B_2O_3$ | 40 to 60 |
| Sodium monoxide | $Na_2O$ | 6 to 14 |
| Lead monoxide | PbO | 0 to 7 |
| Calcium oxide | CaO | 6 to 11 |
| Barium oxide | BaO | 7 to 12 |
| Manganese oxide | MnO | 2 to 6 |
| Cobalt oxide | CoO | 0 to 2 |
| Silica | $SiO_2$ | Under 1 |

Chemically speaking, the frit (glass phase) used in the preparation of the high-temperature enamel is a calcium, barium, sodium and manganese borate which contains alumina. An essential ingredient of the frit is manganese oxide, which contributes greatly to the high chemical stability. The cobalt oxide further contained in the glass serves to enhance the wettability of the base metal, primarily iron but also stainless steel, by the enamel. The glass phase is preferably free of silica, except for traces which may stem from the raw materials. Embedded in the low-silica, and preferably silica-free, glass phase are finely divided solids, especially such having a particle size under $100\mu$, which have various functions. Examples are aluminum powder, silicon powder, chromium oxide, zirconium silicate, copper oxide and calcined alumina.

Suitable mill batches containing the aforementioned frits and further additives have the following approximate analysis in parts by weight:

| frit | 30 to 60 |
| --- | --- |
| aluminum powder | 5 to 60 |
| silicon powder | 0 to 8 |
| chromium trioxide | 0 to 10 |
| zirconium silicate | 0 to 10 |
| copper oxide | 0 to 3 |
| bentonite | 0.5 to 3 |
| water | 70 to 80 |

The aluminum powder improves the adherence, edge coverage and heat resistance of the enamel. The unusually high proportion of boron trioxide in the frit (glass phase) prevents the aluminum powder from reacting with the slip, both during grinding and as the enamel is applied.

The addition of chromium trioxide has a favorable effect on the chemical stability and reduces the susceptibility of the enamel to pitting.

Zirconium silicate (zirconium dust) increases the resistance of the enamel to sudden and cyclic changes in temperature as well as its high-temperature stability.

The addition of silicon metal powder improves the adherence, surface quality and color of the enamel coating. The mill batch may, moreover, include floating agents, extenders and known firing-resistant compounds which are commonly employed in the enameling and ceramic industries.

The grinding of the constituents of the mill batch is effected in the manner customary in the enameling industry, the fineness of the resulting slip and its coating properties being adapted in known manner to the parts to be enameled.

The high-temperature enamel may be applied to the parts in known manner, mufflers and other parts being appropriately dipped in the thoroughly mixed enamel slip. The applied slip may be dried as usual and fired in existing enameling kilns at temperatures between about 800° and 950° C. and firing times between about 3 and 30 minutes.

The high-temperature enamel in accordance with the invention offers the following advantages for exhaust systems of internal-combustion engines, such as mufflers:

It does not exhibit the well-known reboiling effect. Parts coated with this enamel may be repeatedly quenched in cold water while red hot without adherence, appearance or chemical stability being adversely affected thereby.

Parts coated with the high-temperature enamel in accordance with the invention can be welded without the enamel being damaged or losing its advantageous properties. The enamel coating has high impact strength and reliably covers also the edges, thus protecting them, too, against corrosion. The chemical stability of the enamel, and especially its resistance to the exhaust gases of internal-combustion engines and their acidic constituents, is good. Temperature changes will not cause cracks in the enamel. Flaws in the coating will not give rise to attacks on the base metal.

The invention is further described in the following illustrative example:

EXAMPLE

After weighing out and carefully mixing commercial raw materials, a homogeneous melt was produced at 1300° C. and quenched in water. The frit obtained after drying had the following oxide composition in percent by weight:

| Alumina | $Al_2O_3$ | 10 |
| --- | --- | --- |
| Boron trioxide | $B_2O_3$ | 50 |
| Sodium monoxide | $Na_2O$ | 11 |
| Lead monoxide | PbO | 5 |
| Calcium oxide | CaO | 9 |
| Barium oxide | BaO | 10 |
| Manganese oxide | MnO | 4 |
| Cobalt oxide | CoO | 1 |

This frit was then used to prepare a mill batch having the following composition in parts by weight:

| Frit | 40 |
| --- | --- |
| Aluminum powder | 40 |
| Silicon powder | 5 |
| Chromium trioxide | 5 |
| Zirconium silicate | 5 |
| Copper oxide | 2 |
| Bentonite | 1 |
| Water | 75 |

The enamel slip obtained by grinding of the components was applied in the usual manner to the inside and outside of a muffler and then fired in a conventional enameling kiln by heating to 850° C.

It will be appreciated that the instant specification and example are set forth by way of illustration and not limitation, and that various modifications and changes may be made without departing from the spirit and scope of the present invention.

What is claimed is:

1. A muffler for an internal combustion engine enameled with a fired composition of the following approximate analysis in parts by weight:

| aluminum powder | 40 |
| --- | --- |
| silicon powder | 5 |
| chromium trioxide | 5 |
| zirconium silicate | 5 |
| copper oxide | 2 |
| bentonite | 1 |
| water | 75 |
| frit | 40 | said frit having the following approximate analysis in percent by weight:

| Alumina | $Al_2O_3$ | 10 |
| --- | --- | --- |
| Boron trioxide | $B_2O_3$ | 50 |
| Sodium monoxide | $Na_2O$ | 11 |
| Lead monoxide | PbO | 5 |
| Calcium oxide | CaO | 9 |
| Barium oxide | BaO | 10 |
| Manganese oxide | MnO | 4 |
| Cobalt oxide | CoO | 1 |

* * * * *